United States Patent Office 2,983,029
Patented May 9, 1961

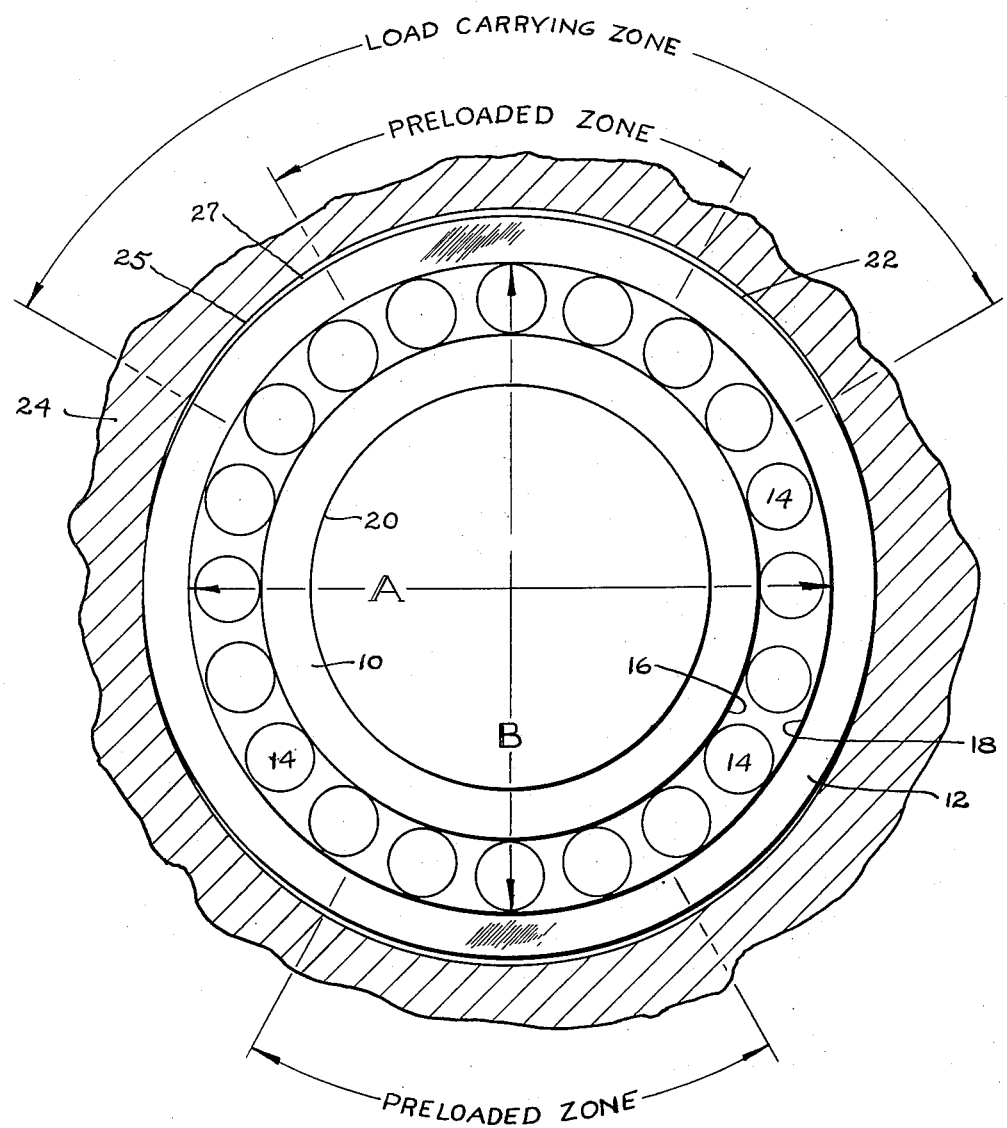

2,983,029
ANTIFRICTION BEARING

Warren G. Perin, Carmel, and Victor W. Peterson, Indianapolis, Ind., assignors to General Motors Corporation, Detroit, Mich., a corporation of Delaware Original application Nov. 30, 1955, Ser. No. 550,015. Divided and this application Mar. 11, 1957, Ser. No. 645,347

4 Claims. (Cl. 29—148.4)

This invention relates to antifriction bearings and particularly to an improved method of making a roller bearing wherein the rolling elements will not slide or shift out of alignment under conditions of sudden change in speed of bearing operation.

This application is a division of our copending application, Serial Number 550,015, filed November 30, 1955, now abandoned.

In the usual type of antifriction bearing for supporting radial loads, an inner race ring and an outer race ring are relatively rotatable through a series of circumferentially disposed intervening rolling elements engaging raceways in these rings, the load being carried by usually less than half of these rolling elements in the load-carrying zone of the bearing. In such a bearing embodying cylindrical rollers, it is well recognized that due to uneven distribution of stress concentrations, the roller ends are weakly supported in comparison to the support of the intermediate portions of the rollers. As a result of this non-uniform stress distribution, it is common for these rollers to skew out of parallelism with the bearing axis particularly when the rollers are running through the unloaded zone of the bearing. Consequently, it is usual practice in a roller bearing to have a very loose fit of the rollers between the race rings when passing through the unloaded zone of the bearing. The axial misalignment and improper rotation of such rollers in a bearing results in a scuffing action on the roller surfaces and on the raceways with the result that objectionable internal friction is set up within the bearing and rapid wear is created causing bearing inaccuracies and short bearing life. Furthermore, when such roller bearings are operated under light load and under conditions of sudden changes in rate of rotation, as occurs in some engines, it has been found that this scuffing and sliding of the rollers is greatly increased causing damage to both rollers and raceways which results in very rapid bearing wear and sudden bearing failure.

It is, therefore, the object of this invention to provide an improved method of making an antifriction roller bearing wherein the tendency of the rolling elements to slide and/or become misaligned is substantially eliminated.

To these ends and also to improve generally upon devices and methods of this character, this invention consists in the various matters hereinafter described and claimed. In its broader aspects, the invention is not necessarily limited to the specific arrangement selected for illustrative purposes in the accompanying drawings wherein The single illustration is a diagrammatic view showing our improved bearing in operating position, certain features being greatly exaggerated to better illustrate the invention.

In accordance with this invention, we have provided an antifriction bearing having an inner race ring 10 and an outer race ring 12 arranged for relative antifrictional rotation through a series of circumferentially disposed rolling elements as rollers 14 for rolling engagement with annular raceways 16 and 18 respectively formed on the inner and outer race rings. These rollers 14 preferably have straight elements that fit against the raceways and are herein illustrated as cylindrical. However, it should be understood that other forms of rolling elements may be included in this invention. If desired, the rollers may be circumferentially spaced from each other by a suitable separator or cage between the race rings. The inner race ring 10, which has a bore 20 for receiving a shaft, has its raceway 16 precisely finished as a surface of revolution herein illustrated as cylindrical and coaxial of the bore 20.

The outer race ring 12 is made initially to a circular form with an outer peripheral surface of revolution 22 coaxial with an outer raceway 18 against which the rollers fit in rolling engagement. With this construction, the outer race ring 12 has a uniform wall thickness throughout its circumference. In the illustrated embodiment, the surfaces 18 and 22 are initially cylindrical but it is to be understood that these surfaces of revolution may be initially of other suitable annular forms. The inner and outer raceways 16 and 18 are ground to such diameters as to receive all of the rollers in light rolling engagement with both raceways if the rollers were mounted in position while the outer race ring is in its initially circular form. However, before assembly of the bearing, the outer race ring 12 is sprung beyond its elastic limit to a slightly out of round condition wherein it maintains a predetermined extent of ovality with a major axis A and a minor axis B. For clarity of illustration, this condition of ovality is greatly exaggerated in the drawing since in some bearings the actual difference in lengths of major and minor axes may be only a few thousandths of an inch or even a lesser distance. If necessary, the outer race ring 12 may be preheated and then sprung to the required final shape while still hot, care being taken that this outer race ring shall not be heated sufficiently to detract from its required hardness.

When the bearing is thereafter assembled with the rollers located in circumferential relation between the circular inner raceway 16 and the slightly oval outer raceway 18, a relative rotation of the race rings causes the rollers 14 to freely roll under substantially no radial load as they pass through the diametrically disposed arcuate bearing zones centered about the opposite ends of the major axis A since the radial spacing of opposed raceway portions along the major axis slightly exceeds the roller diameter. As these rollers approach and pass through the minor axis at diametrically opposite portions of the bearing, they will roll through a slightly converging zone at one side of the minor axis B and through a slightly diverging zone at the other side of this axis, the spacing of the opposite raceway portions being least along the minor axis. This raceway spacing along the minor axis is preferably slightly less than a roller diameter. Hence, when the rollers are located in the short arcuate bearing zones through which the minor axis centrally extends, these rollers will be under a radial load in a preloaded zone as indicated in the drawing. With this arrangement, the rollers upon entering the slightly narrowing throats of the preloaded zones gradually increase their raceway contacts and slightly accelerate in their movements as they approach the minor axis B. This assures a positive and true rolling movement of the rollers as well as an aligning of these rollers into parallel relation with the bearing axis thus eliminating any tendency towards scuffing and roller misalignment as has been common in prior types of roller bearings. Furthermore, our arrangement of passing these rollers through preloaded zones is particularly important in a bearing subjected to sudden changes of rotational speed under conditions of light load since this objectional scuffing, sliding and misalignment has been eliminated even under such operating conditions. It has been found that this roller scuffing and misalignment in prior bearings subjected to sudden acceleration under light load has been an important factor in greatly shortening bearing life and in causing sudden bearing failure.

The assembled bearing is mounted in a suitable support such as a housing 24 as by seating the outer race ring 12 in a cylindrical bore 25 in this housing. We preferably employ a running fit of the outer race ring 12 in this bore, this fit aiding in limiting the extent of ovality of the outer race ring. This mounting provides a slight clearance space 27 between the wall of the bore 25 and the outer race ring 12 adjacent to each preloaded zone of the bearing. The running fit of the outer race ring 12 in the cylindrical bore 25 permits a turning of this race ring in the housing under conditions of sudden acceleration while the bearing carries no appreciable load. When the bearing is operated under load, the outer race ring tends to remain stationary and may radially and resiliently yield slightly into the spaces 27 to avoid excessive loading of the rollers within the preloaded zones. The illustration shows the load carrying zone disposed at each side of the minor axis B and with the outer race ring portions adjacent the laterally disposed major axis A engaging the wall of the bore 25. With this arrangement, the slight yielding of the outer race ring at an end of the minor axis under work load will tend to distribute this load through more rollers in the loaded portion of the bearing thus improving the carrying capacity of the bearing while still assuring a free and true rolling movement of the rollers in parallel relation to the bearing axis. It is not intended to limit the operation of this bearing to the illustrated position since it performs efficiently irrespective of the angular relation of the major and minor axes with reference to the load carrying zone indicated.

We claim:

1. The method of making an antifriction bearing having a series of circumferentially arranged rollers for rolling engagement between a pair of relatively rotatable race rings, comprising the steps of making a circular inner ring and a circular outer race ring, shaping each ring to have a uniform radial wall section throughout its periphery, forming on each ring a circular raceway coaxial with said ring, permanently deforming one of said rings by diametrically compressing said ring beyond its elastic limit causing the ring to retain a predetermined extent of ovality wherein its raceway will be correspondingly oval with predetermined major and minor axes, inserting a series of circumferentially disposed rollers between the circular raceway and the raceway of predetermined ovality for rolling engagement along said raceway throughout the entire circumferential extent of both raceways, and loosely positioning the deformed ring against a circular wall of predetermined diameter to control the extent of said ovality.

2. The method of making an antifriction bearing having a series of rollers for rolling engagement between a pair of relatively rotatable coaxial race rings, comprising the steps of making a circular inner race ring having a uniform radial wall section, forming a cylindrical raceway thereon and coaxially therewith, making a hardened cylindrical outer race ring having a uniform radial wall section, forming a cylindrical outer raceway on and coaxial with the outer race ring, heating the outer race ring without impairing its hardness, diametrically deforming said outer ring beyond its elastic limit to permanently shape it to a slightly oval contour having predetermined major and minor axes in perpendicular relation to each other, assembling between the circular raceway and the oval raceway a circumferentially disposed series of cylindrical rollers for raceway rolling engagement throughout the peripheries of both raceways, the contour of the permanently oval outer raceway being such that the space between the raceways along the minor axis is slightly less than that of a roller diameter and the spacing between the raceways along the major axis slightly exceeds that of a roller diameter, and mounting said outer ring for turning movement against a curved housing wall which limits the outer ring to a predetermined major diameter.

3. The method of providing a preloaded antifriction bearing having a circumferential series of rollers for rolling engagement between a pair of relatively rotatable race rings, comprising the steps of making a cylindrical inner race ring having a uniform radial wall section throughout its peripheral extent, forming a cylindrical raceway thereon and coaxial therewith, making a cylindrical outer race ring having a uniform radial wall section throughout its peripheral extent, forming a cylindrical raceway on and coaxial with the outer race ring, compressing the outer race ring along a diameter of said ring to deform it beyond its elastic limit to a preset slightly oval contour and providing an oval outer raceway thereon having major and minor diameters in perpendicular relation to each other, assembling a series of circumferentially arranged rolling elements between the opposed raceways and mounting the outer race ring for movement within a cylindrical housing bore of a diameter slightly less than that of the major outer diameter of the outer race ring to shape said outer race ring to a predetermined extent of ovality having predetermined major and minor diameters.

4. The method of making an antifriction bearing having a series of rollers for rolling engagement between a pair of relatively rotatable race rings, comprising the steps of making each race ring circular with uniform wall thickness, forming on each race ring a circular raceway coaxial with its race ring, radially deforming one of the race rings beyond its elastic limit to permanently shape that ring and its raceway to a slightly oval contour, assembling a circumferentially disposed series of rollers between the raceways, and mounting the oval race ring against a circular wall which limits said ring to a predetermined extent of ovality.

References Cited in the file of this patent

UNITED STATES PATENTS

| | | |
|---|---|---|
| 1,803,966 | Gibbons | May 5, 1931 |
| 2,259,324 | Robinson | Oct. 14, 1941 |
| 2,633,627 | Olmstead | Apr. 7, 1953 |

FOREIGN PATENTS

| | | |
|---|---|---|
| 250,412 | Great Britain | Apr. 15, 1926 |
| 125,542 | Switzerland | Apr. 16, 1928 |
| 837,249 | France | Nov. 3, 1938 |
| 1,079,848 | France | May 26, 1954 |